Patented Apr. 17, 1951

2,548,922

UNITED STATES PATENT OFFICE 2,548,922

PROCESS FOR PREPARATION OF STEROIDAL HYDROXY KETONES

Romeo B. Wagner, State College, Pa., and James A. Moore, Detroit, Mich., assignors to Parke, Davis & Company, Detroit, Mich., a corporation of Michigan No Drawing. Application December 3, 1949, Serial No. 131,057

3 Claims. (Cl. 260—397.4)

This invention relates to a process for the preparation of steroids. More particularly, it relates to the preparation of steroids which are characterized by having a cortical side chain, that is, having hydroxyl or esterified hydroxyl groups at $C_{17}$ and $C_{21}$ and a keto group at $C_{20}$. These 20-keto-17,21-pregnandiol compounds can be represented by the following formula:

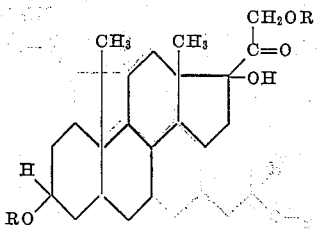

where R is hydrogen or a lower aliphatic carboxylic acyl radical.

In accordance with the invention the 20-keto-17,21-pregnandiols or their corresponding acyl derivatives having the above formula are prepared by reacting 20-bromo-$\Delta^{17}$-pregnen-21-ol compounds of the formula,

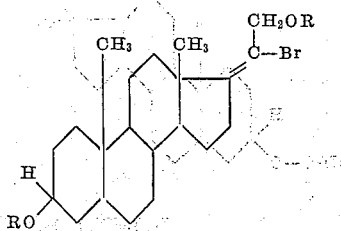

with osmium tetroxide, where the R groups have the same significance as above. The reaction is carried out below 50° C. and preferably at about 20 to 30° C. Although the starting compounds containing R=hydrogen will undergo the reaction, the best yields are obtained using starting materials containing R=lower acyl radical. The solvent for the reaction is a lower aliphatic ether or a cyclic ether.

The products of the invention are useful intermediates for the preparation of other organic compounds and, in particular, for the preparation of steroids similar in structure to those found in the adrenal cortex.

The following examples are illustrative:

Example 1

1500 mg. of osmium tetroxide are added to a solution of 1166 mg. of 20-bromo-$\Delta^{17}$-pregnen-3($\beta$),21-diol diacetate in 50 cc. of ether. A black precipitate forms after a few minutes. With the mixture in a loosely stoppered flask permitting slow evaporation of the solvent, crystallization occurs after seven days. The crystals are redissolved in more ether and the black osmium compound is separated by filtration. The filtrate is washed with ten portions of aqueous sodium thiosulfate and then with water. The dried ether layer is concentrated and the residue is dissolved in methanol, charcoaled and allowed to crystallize. The resulting white needles of pregnan-3($\beta$),17($\alpha$),21-triol-20-one-3,21-diacetate melt at 149–151° C. The formula of this product is,

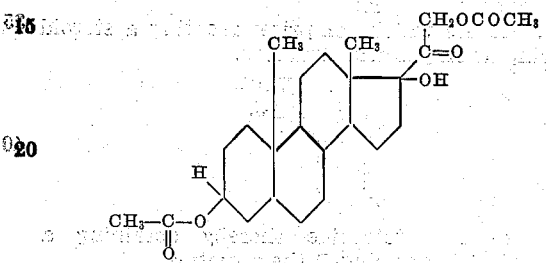

Example 2

1380 mg. of osmium tetroxide are added to a solution of 980 mg. of 20-bromo-$\Delta^{17}$-pregnen-3($\beta$),21-diol in 40 cc. of ether. After standing for seven days, the resulting solid which separates is dissolved in more ether and the mixture is filtered. The filtrate is washed with aqueous sodium thiosulfate and then water. The ether layer is dried and concentrated. The resulting solid is crystalline and has the structure:

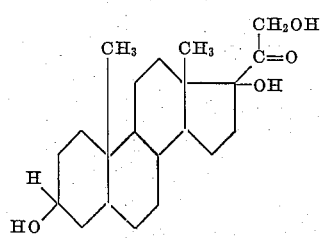

This solid is then dissolved in 5 cc. of acetic anhydride and 5 cc. of pyridine. After standing for one hour the solution is treated with 200 cc. of water. The oil is extracted with ether, washed with dilute hydrochloric acid, water, dilute sodium bicarbonate and water. The dried ether extract is concentrated and the residue is recrystallized from methanol. The crystals of pregnan-3($\beta$),17($\alpha$),21-triol 3,21-diacetate melt at 150–

151° C. and are identical with the diacetate obtained in Example 1.

The 20-bromo-$\Delta^{17}$-pregnen-21-ol compounds used as starting materials in the practice of the invention may be prepared by the methods described and claimed in our copending application Serial No. 131,056, filed under even date herewith. Said methods comprise the reduction of 20-bromo-$\Delta^{17}$-pregnen-21-oic acids or esters of same with lithium aluminum hydride. The resulting steroid alcohol derivatives can be converted to the carboxylic acid acyl derivatives by treatment with a lower aliphatic acid anhydride alone or in the presence of a basic substance.

The above mentioned 20-bromo-$\Delta^{17}$-pregnen-21-oic acids and esters may be prepared by the methods described and claimed in our copending application Serial No. 131,055, filed under even date herewith. Said methods comprise reacting 17,21,21-tribrominated pregnanes with an alkali metal hydroxide dissolved in a lower aliphatic alcohol and at a preferable reaction temperature of about 85–95° C. The resulting acids are converted to the corresponding esters by treatment of the acids with a diazoalkane in an inert organic solvent.

The above mentioned 17,21,21-tribrominated pregnanes may be prepared by the methods described and claimed in our copending application Serial No. 131,054, filed under even date herewith. Said methods comprise bromination at a temperature above 50° C. of the corresponding pregnanolones.

What we claim is:

1. Process which comprises reacting a steroid having at ring D the structure,

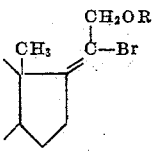

with osmium tetroxide thereby obtaining a steroid having at ring D the structure,

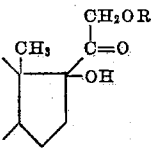

where R is a member of the class consisting of H and lower aliphatic carboxylic acyl radicals.

2. Process which comprises reacting a steroid of formula,

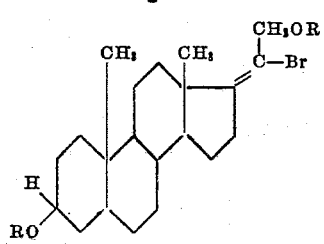

with osmium tetroxide thereby obtaining a steroid of formula,

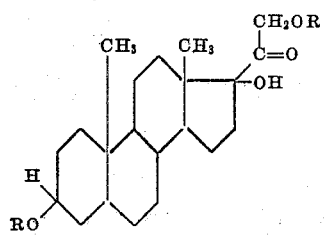

where R is a member of the class consisting of hydrogen and lower aliphatic carboxylic acyl radicals.

3. Process which comprises reacting a steroid of formula,

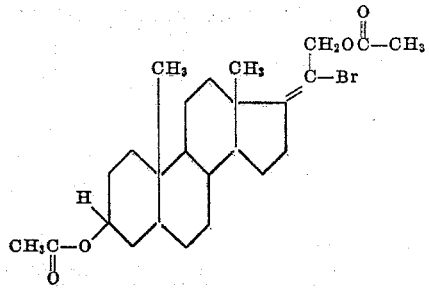

with osmium tetroxide thereby obtaining a steroid having the formula,

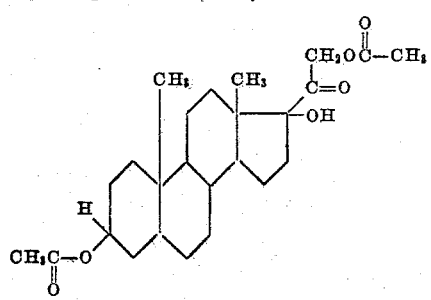

ROMEO B. WAGNER.
JAMES A. MOORE.

No references cited.